(12) United States Patent
Onrot et al.

(10) Patent No.: US 8,732,869 B2
(45) Date of Patent: *May 27, 2014

(54) COMPLIANT IMPACT PROTECTION PAD

(75) Inventors: Martin Paul Onrot, Boynton Beach, FL (US); Iris Grant Onrot, Boynton Beach, FL (US)

(73) Assignee: Comfihips, LLC, Boynton Beach, FL (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/413,446

(22) Filed: Mar. 6, 2012

(65) Prior Publication Data

US 2012/0174301 A1    Jul. 12, 2012

Related U.S. Application Data

(63) Continuation-in-part of application No. 12/401,265, filed on Mar. 10, 2009, now Pat. No. 8,151,376.

(60) Provisional application No. 61/599,636, filed on Feb. 16, 2012, provisional application No. 61/061,296, filed on Jun. 13, 2008.

(51) Int. Cl.
*A41D 13/00* (2006.01)

(52) U.S. Cl.
USPC ............................................................ 2/465

(58) Field of Classification Search
USPC .............. 2/267, 268, 2.5, 16, 44–45, 247, 23, 2/465, 455, 227, 238; 128/878, 881, 882
See application file for complete search history.

(56) References Cited

U.S. PATENT DOCUMENTS

| | | | |
|---|---|---|---|
| 3,447,163 A | 6/1969 | Bothwell et al. | |
| 3,895,152 A | 7/1975 | Carlson et al. | |
| 4,023,569 A | 5/1977 | Warnecke et al. | |
| 4,422,183 A | 12/1983 | Landi et al. | |
| 4,573,216 A | 3/1986 | Wortberg | |
| 5,030,501 A | 7/1991 | Colvin et al. | |
| 5,062,433 A | 11/1991 | Kummer | |
| 5,450,625 A | 9/1995 | Hu | |
| 5,496,610 A | 3/1996 | Landi et al. | |
| 5,501,891 A | 3/1996 | Saika et al. | |
| 5,524,641 A | 6/1996 | Battaglia | |

(Continued)

FOREIGN PATENT DOCUMENTS

CA    2282471 C    2/2005

OTHER PUBLICATIONS

Hiroyasu Okuizumi et al., "Effect on the Femur of a New Hip Fracture Preventive System Using Dropped-Weight Impact Testing", Journal of Bone and Mineral Research, vol. 13, No. 12, 1998, pp. 1940-1945.

*Primary Examiner* — Tejash Patel
(74) *Attorney, Agent, or Firm* — Arent Fox LLP

(57) ABSTRACT

A hip protector pad absorbs impact energy at a vulnerable area of a greater trochanter of an adult human hip. The pad has a continuous sheet of flexible honeycomb material having faces covered with an optional cover material and a layer of compliant and resilient foam on an inner side and an outer side of the honeycomb material. The pad is flexible to conform to a shape of the hip area. The pad is effective to reduce an impact of a fall of an adult human on the vulnerable area and minimizes the chance of a hip fracture resulting from the fall.

21 Claims, 14 Drawing Sheets

(56) References Cited

U.S. PATENT DOCUMENTS

| | | |
|---|---|---|
| 5,557,804 A | 9/1996 | Ovortrup et al. |
| 5,599,290 A | 2/1997 | Hayes et al. |
| 5,636,377 A | 6/1997 | Wiener |
| 5,717,997 A | 2/1998 | Garcia |
| 5,722,093 A | 3/1998 | Andresen |
| 5,840,397 A | 11/1998 | Landi et al. |
| 6,093,468 A | 7/2000 | Toms et al. |
| 6,151,714 A | 11/2000 | Pratt |
| 6,195,809 B1 | 3/2001 | Garcia |
| 6,347,413 B1 | 2/2002 | Sciscente et al. |
| 6,519,781 B1 | 2/2003 | Berns |
| 6,859,948 B2 | 3/2005 | Melts |
| 7,100,216 B2 | 9/2006 | Matechen et al. |
| 8,151,376 B2 * | 4/2012 | Onrot et al. ............ 2/465 |
| 2004/0049827 A1 | 3/2004 | Melts |
| 2004/0168245 A1 | 9/2004 | Goodwin |
| 2005/0203454 A1 | 9/2005 | Wiener |

\* cited by examiner

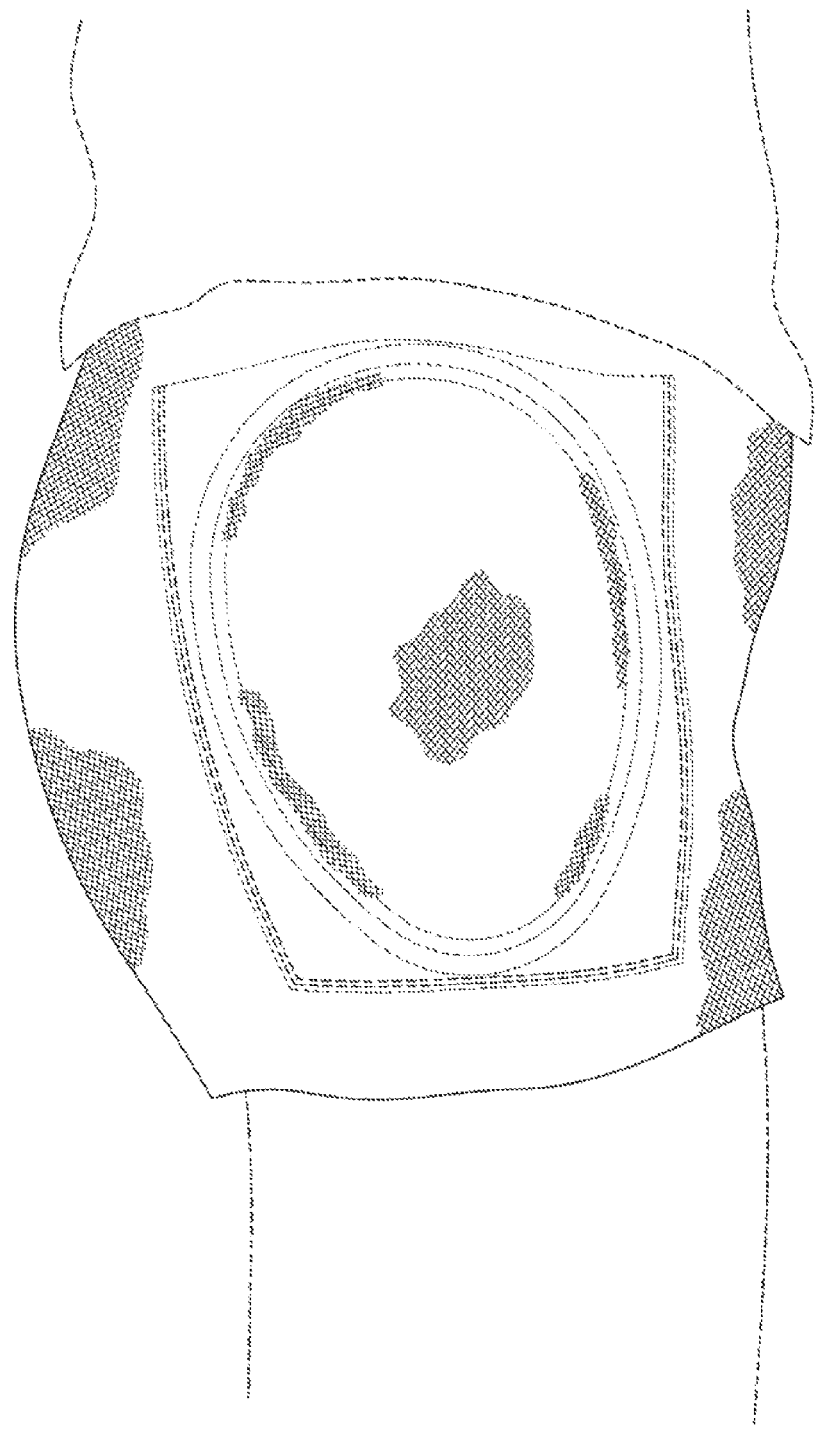

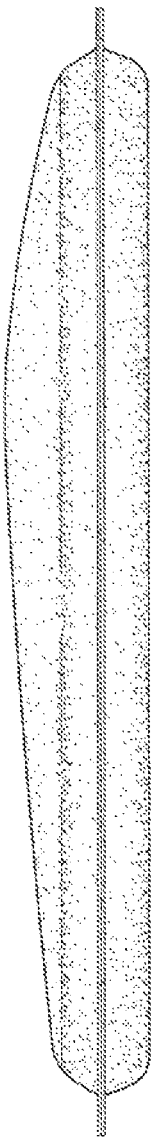

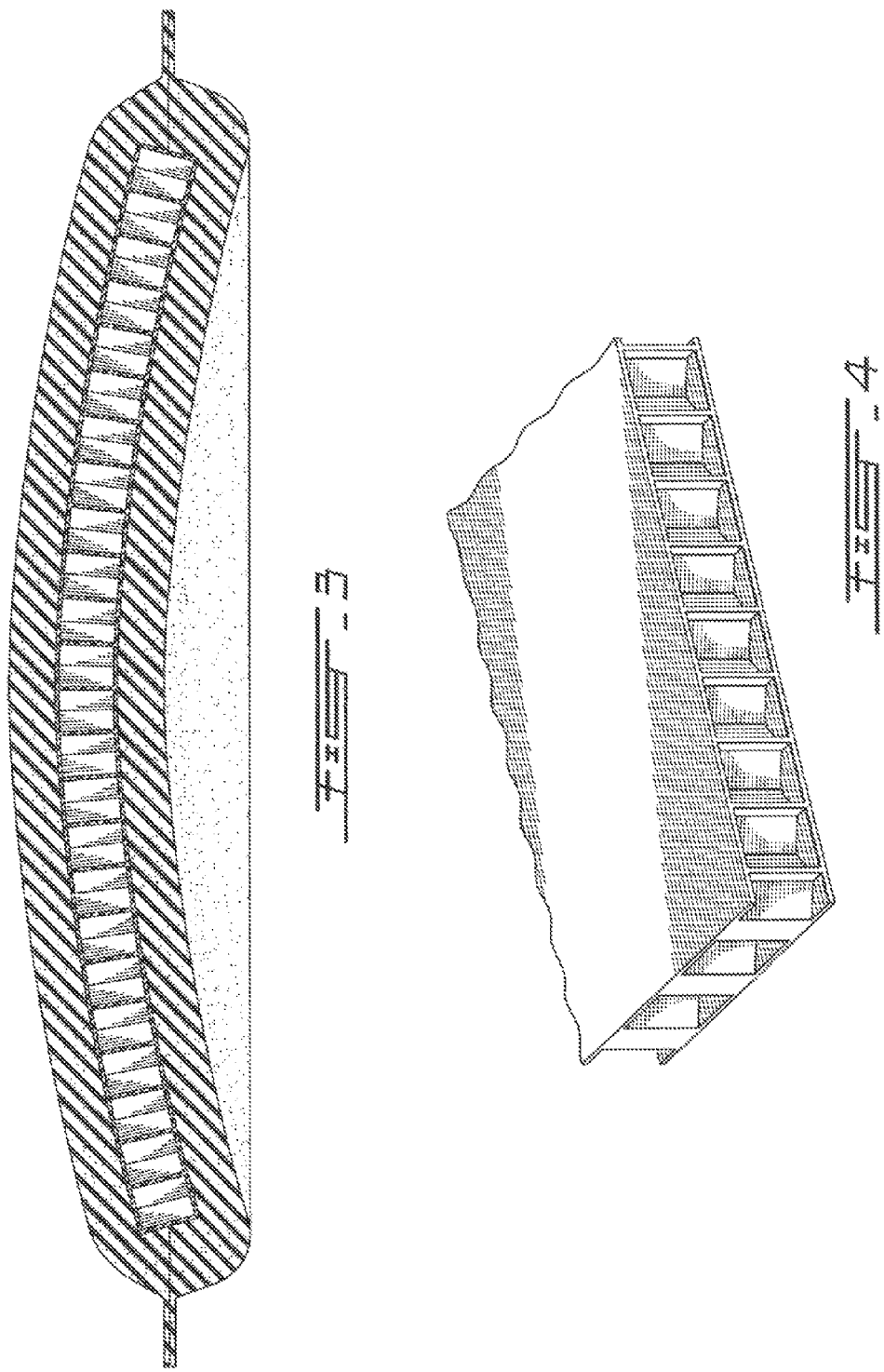

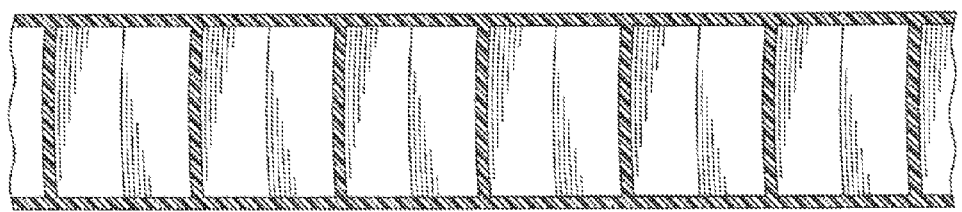
FIG. 5
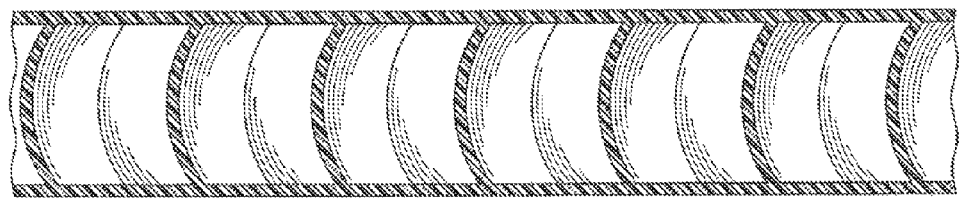
FIG. 6

COMPLIANT IMPACT PROTECTION PAD

This application claims priority to U.S. provisional patent application Ser. No. 61/599,636 filed Feb. 16, 2012 and is a continuation in part of U.S. patent application Ser. No. 12/401,265, filed Mar. 10, 2009, which claims priority to U.S. provisional application Ser. No. 61/061,296 filed Jun. 13, 2008. The entirety of each of the foregoing is hereby incorporated by reference herein.

TECHNICAL FIELD

The present invention relates to the field of impact protection pads. The invention also relates to the combination of such pads and supporting garments.

BACKGROUND

Falls among the elderly can be traumatic and potentially life threatening (see Okuizumi, H., Harada, A, Iwata, H. & Konishi, N. (1998). *Effect on the femur of a new hip fracture preventative system using dropped-weight impact testing.* Journal of Bone and Mineral Research, 13: 1940-1945., and Wiener, S. L., Andersson, G. B. J., Nyhus, L. M. & Czech, J. (2002). *Force reduction by an external hip protector on the human hip after falls.* Clinical Orthopaedics and Related Research, 398: 157-168.). Injuries sustained at the hip during a fall can range from minor bruising to more catastrophic fractures of the femur. As a result, the risks of morbidity, disability, long-term institutionalization and death all increase (see for example Cooper, C. Atkinson, E. J., Jacobsen, S. J., O'Fallon, W. M., & Melton, L. J. III (1993). *Population-based study of survival after osteoporotic fractures.* American Journal of Epidemiology, 137: 1001-1005). The occurrence of fractures is associated with a direct impact to the trochanteric area of the hip (see Cummings, S. R. & Nevitt, M. e. (1989). *A hypothesis: The causes of hip fractures.* Journal of Gerontology. 44: MI07-M111, as well as Nevitt, M. C. & Cummings, S. R. (1993). *Type of fall and risk of hip and wrist fractures: The study of osteoporotic fractures.* Journal of the American Geriatrics Society, 41: 1226-1234), and the severity of the injury is affected by the falling mechanisms, the impact energy during the fall, and the energy absorption of the soft tissue in the surrounding area. One method of preventing or diminishing the severity of injuries during falls is to protect the hip with external padding.

Previous research suggests that hip padding or hip protectors are a viable method of preventing hip fractures. Research suggests that hip protectors may help reduce the incidence of hip fractures by more than 50% (see the articles by Ekman, A, Mallmin, H., Michaelsson, K., & Ljunghall, S. (1997). *External hip protectors to prevent osteoporotic hip fractures.* Lancet, 350: 563-564, by Kaunus, P., Parkkari, J., Niemi, S. et al. (2000). *Prevention of hip fracture in elderly people with use of a hip protector.* New England Journal of Medicine, 343: 1506-1513, and by Lauritzen, J. B., Petersen, M. M. & Lund, B. (1993). *Effect of external hip protectors on hip fractures.* Lancet, 341: 11-13).

Impact protection pads, such as hip protectors, can be understood to fit within two classes of products. The first class of such protection pads, as illustrated in FIG. 1A, have a hard shell that seeks to transfer or redistribute impact energy from a vulnerable area to a surrounding area, and in the case of hip protectors, they attempt to avoid contact with the greater trochanter area of the femur, while engaging the soft tissue surrounding the greater trochanter area. Such protectors can cause bruising and even a tearing of the skin where the rigid shell impacts on the soft tissue. The result can be lead to infection and/or require significant time to heal. This makes for a significant bulge, see for example U.S. Pat. No. 5,557,804 to Ovortrup et al. Such protection pads are effective for their intended purpose, namely to protect the vulnerable body area, however, the comfort of the person wearing the protector is certainly compromised when resting or otherwise applying pressure on the protector.

The second class of such protection pads seek to absorb impact energy generally over the vulnerable area. Again in the case of hip protectors, an example of such a pad is U.S. Pat. No. 4,573,216 to Wortberg. With such devices, as illustrated in FIG. 1B, the object is to provide a comfortable, compliant pad that can be worn, and then on impact can dissipate the impact energy so that peak impact force remains below a lower average breaking threshold of the adult femur. This absorption of the impact energy does involve some spatial redistribution of force, however, due to its essentially flexible and non-rigid structure, the spatial spread out of the impact energy is still over the vulnerable area with only partial distribution onto the surrounding soft tissue, and the spreading of the impact energy is only partly responsible for the reduction in peak impact forces, while the internal absorption of impact within the pad structure temporally spreads out the impact energy and reduces peak impact force.

Also known in the art is a body protection pad, as illustrated in FIG. 1C, that has a number of small fragments of honeycomb covered with and interconnected by a dense foam molded over the fragments to flex at the interfaces of the fragments. Such a pad is manufactured for the motorcycle body armour market by Planet-Knox, Cumbria, United Kingdom. The pads come in a variety of shapes for different body parts. The pad illustrated is the shape designed for the shoulder, and is resold in the UK for use as a hip pad for the elderly. However, a point impact at an interface between fragments of the honeycomb results in potentially greater peak impact than impact in the middle of a fragment. Also, while compliance is good for curving over a knee or elbow, the honeycomb itself does not undergo flexion and compliance as the webbing between fragments and the protected body tissue is more supple than the honeycomb.

For some applications, such as hip protectors, comfort of the protection pad is quite important. The pad is worn on the body preferably both day and night. Removal of the pad exposes the user to the risk of hip fracture, and comfort is important.

SUMMARY OF THE INVENTION

It has been discovered that a compliant or pliable foam-honeycomb-foam sandwich has better impact properties than solid foam of the same thickness and compliance. High density closed-cell foam of the same thickness offers higher impact absorption, however, its compliance when worn on the body as a protective pad is lower than an equivalent thickness sandwich.

In some embodiments, there is provided a hip protector pad of the type that absorbs impact energy essentially at a vulnerable area of a greater trochanter of an adult human hip without significant redistribution of energy to a surrounding soft tissue area. The pad has a continuous piece of flexible honeycomb material and a layer of compliant and resilient foam on an inner side and an outer side of said honeycomb material. The pad fits comfortably over an adult human hip and is effective to reduce an impact of a fall of an adult human on said vulnerable area to be below an average adult human hip fracture impact level. From the point of contact with a fall, there is a localized spreading out of energy due to the foam-honeycomb-foam combination which causes a gradual more controlled deceleration of impact at the point of impact. There is a cone of influence from the point of impact of approximately 45 degrees out from the point of contact. This point of impact is dispersed to a broader area due to the overall thickness of the pad. While this broader area may extend to the soft tissue area, an impact at a vulnerable area of the greater trochanter of an adult human hip will result in dampened impact forces being received for the most part by the greater trochanter.

Honeycomb material in this specification means any geometry of cells, whether hexagonal or other shape. In some embodiments the pad is convexly shaped to better fit the shape of the adult human hip. Different shapes for men and women may be provided.

In some embodiments, the honeycomb material has wavy cell walls to allow greater resilient compression of said honeycomb material.

For user comfort, in some embodiments, the pad is less than 23 mm thick. For example, the foam layers may each be about 7 mm thick and made of high density, closed-cell foam, such as a high-density polyethylene foam. In other embodiments the pad may include a lower density foam.

In some embodiments, the pad includes an outer envelope, coating or skin covering the layer of foam, the envelope having a coefficient of friction on cotton lower than a coefficient of friction of said foam on cotton. This envelope can comprise a textured surface or skin of the layer of foam as a result of being molded.

In some embodiments, the pad includes an outer envelope, coating or skin covering the layer of foam, the envelope being watertight. This envelope can comprise a textured surface or skin of the layer of foam as a result of being molded.

In some embodiments, the hip protector pad has an egg-shape or an oval shape.

BRIEF DESCRIPTION OF THE DRAWINGS

The invention will be better understood by way of the following detailed description of an embodiment of the invention with reference to the appended drawings, in which:

f. FIG. 2C illustrates the pad inside underwear worn by a user;

g. FIG. 2D (formerly FIG. 12) is an oblique view from the inside side of the pad;

h. FIG. 2E (formerly FIG. 15) is a side view from the side of pad;

j. FIG. 3 is a sectional view of the pad illustrating the sandwich construction of foam-honeycomb-foam;

k. FIG. 4 is an enlarged plan view of the honeycomb structure of the embodiment of FIG. 3;

l. FIG. 5 is an enlarged sectional side view of the honeycomb structure in a state of no impact compression;

m. FIG. 6 is an enlarged sectional side view of the honeycomb structure in a state of impact compression showing flexion of the wavy side walls of the honeycomb structure;

DETAILED DESCRIPTION

Figure 2A:
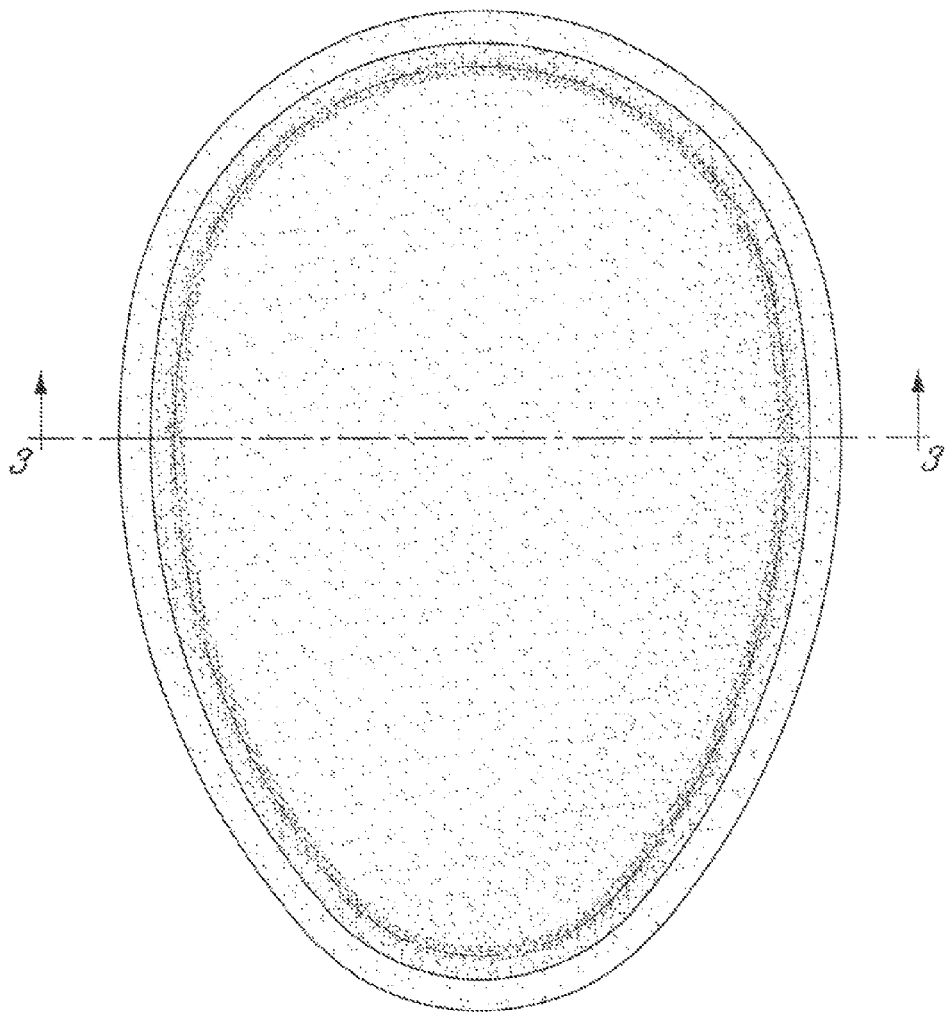
FIG. 2A is a plan view from the outside of the hip pad according to one embodiment.
Figure 2B:
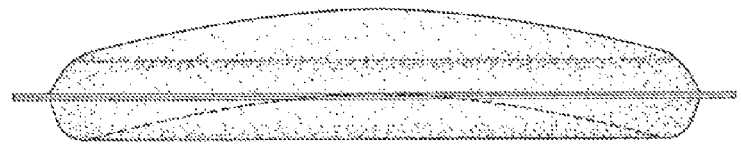
FIG. 2B is a side view from the bottom of the hip pad with the outside side of the pad being on top with the concave inside or body side of the pad being shown in stippled lines.
Figure 20:
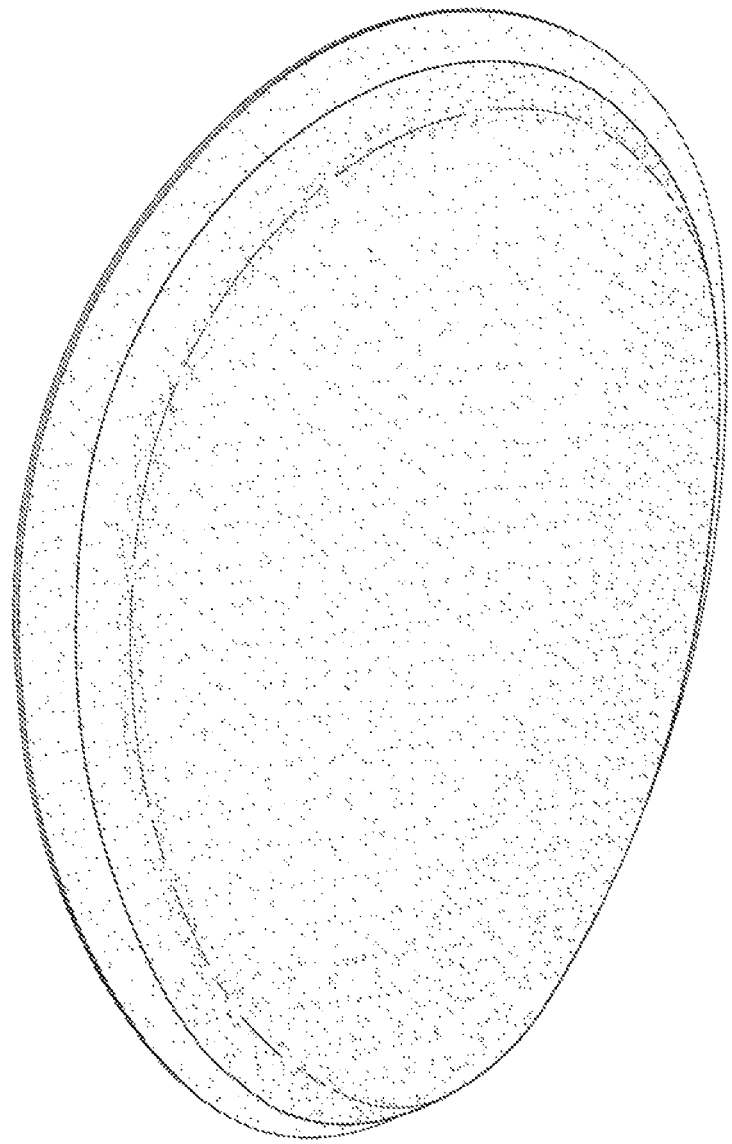
Figure 2F:
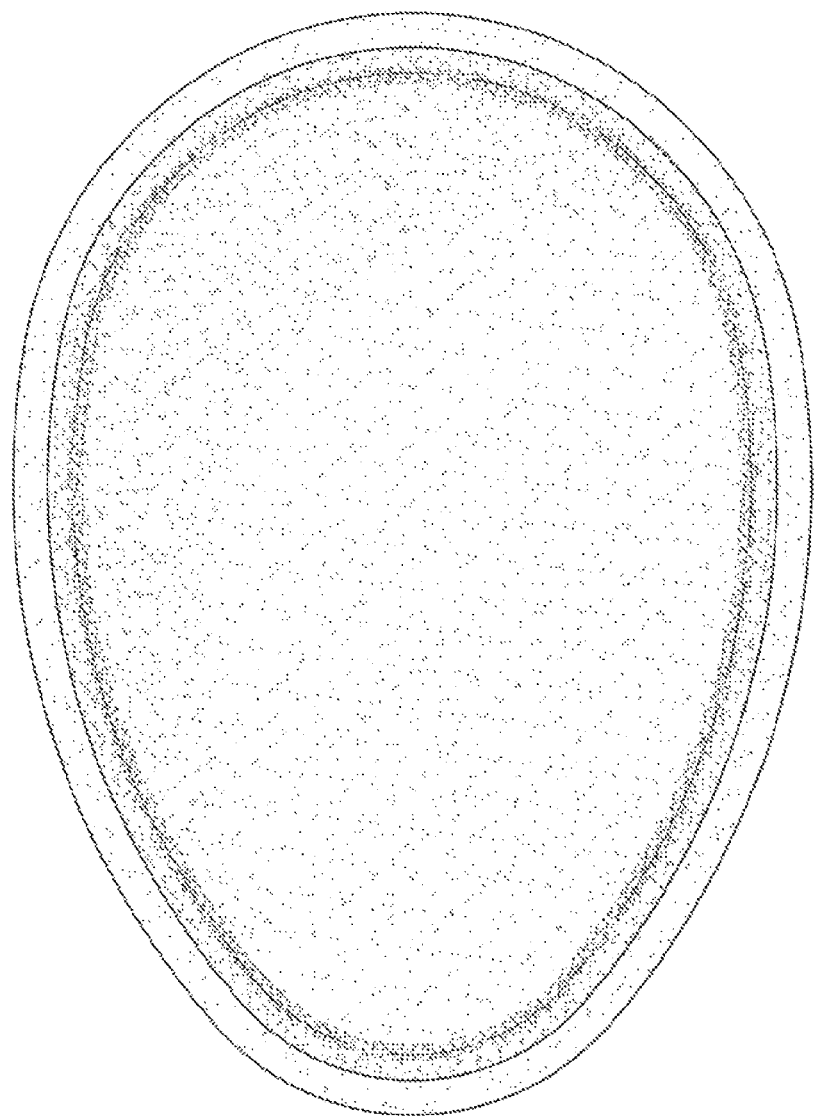
FIG. 2F (formerly FIG. 16) is a plan view from the inside of the hip pad.

In the embodiments illustrated in FIGS. 2A and 2B, the hip protector pad has an egg-shape. The pad may be worn by insertion into a pocket of an undergarment, as shown in FIG. 2C. The pad is to be roughly positioned with its middle over the greater trochanter area. The slightly convex shape allows for a better fit over the user's hip, namely the inside surface of the pad can make roughly even pressure contact on the skin of the user when standing up without flexing the pad. The elasticity of the garment can shape the pad to conform to the wearer's hip.

As illustrated in FIG. 3, the structure of the pad in the embodiment of FIGS. 2A and 2B is a sandwich of foam-honeycomb-foam. The foam is high-density polyethylene foam having a thickness of 7 mm, and the honeycomb material is likewise about 7 mm thick. In another embodiment, the foam may be lower density. The honeycomb may be covered with a non-woven fabric scrim bonded to the honeycomb. The scrim prevents the foam from pushing through the openings in the honeycomb material under impact conditions. The honeycomb sheet is flexible when bent by hand. The honeycomb material of the embodiment of FIGS. 2A and 2B is commercially available from NidaCore Corporation of St. Lucie, Fla., model H8PP. The foam is a high density, closed-cell, polyethylene foam, as for example is available from PXL, of Coburg, Ontario. The sandwich arrangement may include air pockets between the foam and honeycomb layers. For example, in an aspect of the invention, the air pockets may be located between the honeycomb layer and the inner foam layer, wherein the inner foam layer is the layer closest to the user's hip when the pad is worn.

It will be appreciated that any material having suitable properties of pliability, resiliency and impact absorption may be used for the foam. Most any high-density synthetic rubber foam material could have suitable properties as the PXL foam has demonstrated in tests. The high density foam of the embodiment illustrated is stiff, and in a 21 mm thickness is much less bendable or able to conform to the wearer than the foam-honeycomb-foam sandwich structure having a 21 mm thickness. The foam need not be the same on each side of the honeycomb, and for example, it could be more compliant against the body than on the outside for greater comfort.

As shown in FIG. 4, the honeycomb structure of the embodiment of FIGS. 2A and 2B has a hexagonal cell shape. When under no load, the cells are in their normal state with walls that have a slight waviness or buckle, as shown in FIG. 5, however, under the force of impact, the cell walls resiliently deform as shown in FIG. 6. This deformation absorbs impact energy. The wavy cell wall is created during the extrusion process of the honeycomb board. This property can be provided whether the honeycomb cell is of hexagonal geometry or any other geometry.

In some embodiments, the resilient honeycomb structure in some embodiments can be bent to take the shape of the wearer's hip area. This bending or shaping can be helped by the molding process, be done by hand shaping, or by the garment's action on the pad. This makes the pad more comfortable since it follows the shape of the hip area and protrudes less than if the honeycomb core were not at least partly bendable or malleable. This also creates a visually less obtrusive pad for others to see and therefore greater user compliance.

The size of the honeycomb structure should be sufficient to cover the greater trochanter area and extend partly over the surrounding soft tissue area. Oversizing the honeycomb core does not impede function of the pad, and allows for the pad to shift with respect to the hip without putting at risk protection. Because the honeycomb core is flexible, and covers a large area, and is well surrounded by the foam, no bruising of the skin or soft tissue within, at the edge or outside of the honeycomb core has been observed.

The shape of the pad illustrated, namely an egg-shape or oval shape, is easy to insert into a pocket of the undergarment, as shown in FIG. 2C. It will be appreciated that a variety of shapes are possible. For example, a rectangular shape may also fit into a rectangular pocket. If the garment is simply a garter belt like garment, then the upper edge may be flat to connect more easily to the belt. While in the embodiment illustrated, the honeycomb has the same shape and almost the same area as the foam, it may be desirable to have a smaller honeycomb portion within a larger foam pad. While the foam used in the embodiment illustrated is of uniform thickness and pinched at its edge, it is possible to have a thicker region and a thinner region as desired for both trochanter area protection and comfort. The pad may be essentially integrated into the garment, such as underwear, exercise pants, or a bathing suit, or removable to fit into a pocket of such garments, as desired.

Manufacture of Pad

The pads are manufactured by first cutting the two foam pads to a size greater than the desired size of the finished product. The honeycomb is produced as a block, and cut to the desired thickness. The scrim is bonded to the sheets as desired. Each sheet is cut to have the desired shape. The foam extends about 5 millimeters beyond the honeycomb. The honeycomb middle section is precut to the desired shaped. The foam is then fed into a heated tunnel oven to soften the material. The two pieces of foam with the honeycomb placed in between the foam are then placed into a water cooled mold that compresses the three components together creating the desired shape and contour of the finished product. The heated foam may adhere to the scrim of the honeycomb and to the foam of the other piece of foam at the edges. Alternatively, the portion of the heated foam layers that extend beyond the honeycomb may adhere together without adhering to a scrim sheet. In the same operation, a steel rule in the mold cuts the profile of the finished product. Once the foam/honeycomb/foam has cooled to a suitable temperature, the mold releases the finished product. The exterior of the foam can be given a suitable texture by the mold.

Impact Tests

Experimental Setup

All testing was conducted in the Biomechanics Laboratory located in the Center for Exercise Science at the University of Florida. Materials were evaluated using an impactor apparatus. The apparatus consisted of an impactor, custom made at the University of Florida that was located directly above a forceplate (Model 4060, Bertec Corporation, Columbus, Ohio). A metal plate (12 mm thick) was secured on the forceplate to prevent damage to the top plate of the forceplate. Data were collected using EvaRT software (Motion Analysis Corp., Santa Rosa, Calif.) and sampled at 10,000 Hz.

The impactor consisted of parts: an inverted-U shaped frame, 2 rods extending vertically from the frame and a bridge and a striker. The bridge assembly consisted of a rectangular base anchored to the top of the frame. Two steel rods extended vertically upward from the base, providing support for the bridge. The bridge could then be fixed to any location along the two rods with bolts and nuts. The striker consisted of a long metal rod and a steel head (total mass 3.18 kg).

The amount of impact force being delivered in the experiment was manipulated by using different drop masses and drop heights (Table 1). To increase the mass of the striker, 2.26- and 4.53-kg weight plates were secured at the junction of the rod and head to yield three drop masses (3.18, 5.44, and 7.71 kg). These three masses correspond to 7, 12, and 17 pounds weight in imperial units, By fixing the bridge assembly at different locations along the two vertical rods, three drop heights were used in this project (0.4, 0.6, and 0.8 m). As a result, there were a total of nine impact conditions (3 masses×3 heights).

TABLE 1

Characteristics of Different Impact Conditions.

| Impact | Condition # | Mass (kg) | Drop Height i. (m) | Velocity at Impact (m/s) | Kinetic Energy at Impact (J) |
|---|---|---|---|---|---|
| b. | 1 | 3.18 | 0.4 | 2.8 | 12.5 |
| c. | 2 | 5.44 | 0.4 | 2.8 | 21.4 |
| d. | 3 | 7.71 | 0.4 | 2.8 | 30.3 |
| e. | 4 | 3.18 | 0.6 | 3.43 | 18.7 |
| f. | 5 | 5.44 | 0.6 | 3.43 | 32.0 |
| g. | 6 | 7.71 | 0.6 | 3.43 | 45.4 |
| h. | 7 | 3.18 | 0.8 | 3.96 | 24.9 |
| i. | 8 | 5.44 | 0.8 | 3.96 | 42.7 |
| j. | 9 | 7.71 | 0.8 | 3.96 | 60.5 |

Session I

This testing session was completed on Jun. 7, 2005.

Baseline Impact Tests. To determine the amount of force being attenuated by the use of a padding, the force transmitted without the use of a padding (the so-called baseline value) must be known. Therefore, baseline impact forces were collected without placing any force absorbing materials between the striker and forceplate. The striker (3.18 kg) was dropped from several drop heights, starting at 0.05 m and increasing in increments of 0.05 m, until peak forces values reached a magnitude large enough to potentially damage the forceplate (i.e., exceeding the rated load of 18,000 N of the forceplate). The baseline tests reached a maximal drop height of 0.4 m for the flat striker and 0.35 m for the round striker.

Honeycomb Testing. The hip protector under investigation is comprised of three layers—an outer foam layer to absorb impact and to provide comfort, a middle honeycomb layer with the primary function of force attenuation, and an inner foam layer for user comfort and for impact absorption. To get a better idea of the type and thickness of honeycomb to be tested in Session II, impact tests were performed on seven different honeycomb boards. Using the impactor apparatus, each honeycomb board was impacted with the flat striker under nine different impact conditions specified in Table I. As a result, a total of 54 impact tests were completed (6 boards×9 conditions). For each impact test, the peak force transmitted through the honeycomb was identified from vertical ground reaction forces recorded by the forceplate and the amount of material deformation (indentation depth) was measured using a caliper.

Session II

This testing session was completed on Jun. 18, 2005. The primary purpose of this session was to perform impact tests on different combinations of foam as inner and outer layers and honeycomb as the middle layers. A large number of 7 mm thick foam boards of different colors were provided for the outer and inner layers:

Gray (G)—The foam has a density of 4.0 lbs/cubic foot. The foam also comprises a crosslinked thermoplastic material, for example, a polyolefin such as polyethylene and includes closed cells.

Blue (B)—The density is 2.8 lb/cubic foot. The foam comprises crosslinked polyethylene, and includes nitrogen infused at a high pressure. The foam includes closed cells. The foam is available from Zotefoams under the product identification number LD45.

White (W)—The foam has a density of 2.0 lb/cubic foot. The foam comprises crosslinked, polyethylene, and includes closed cells.

Honeycomb boards from two different suppliers were used. For the purpose of this report, boards from these two suppliers were labeled as H1 and H2. Therefore, 18 different foam-honeycomb-foam (FHF) combinations (3 inner layers×2 honeycombs×3 outer layers) were available for testing. H2 includes a cell size of 0.315 inch, 5.0 lb density, and includes a veil cover material. The cells comprise polypropylene with a tubular form. H1 includes 6 sided hexagonal, 8 mm, polypropylene cells, and a veil cover material.

Figure 7:
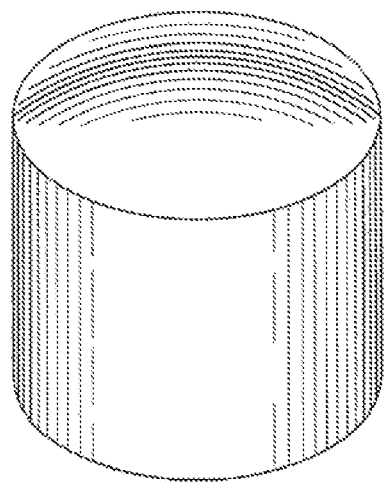
FIG. 7 is a side view of a test rounded striker head.
Figure 8:
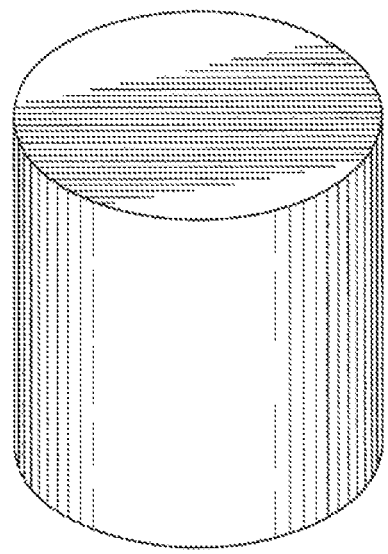
FIG. 8 is a side view of a flat striker head.

To simulate the shape of the greater trochanter of femur, a round striker head was also used in addition to the flat head (FIG. 7). As a result, a total of 18 impact conditions (3 drop masses×3 drop heights×2 heads) were applied to each padding condition. In other words, a total of 324 tests (18 impact conditions×18 padding combinations) were planned for this session. During each impact test the impact forces transmitted through the padding were recorded by the forceplate underneath the padding. In each trial, the layers of padding were tightly fitted inside a wooden frame and placed under the striker of the impactor apparatus (FIG. 8). Impact tests were conducted sequentially in order from the least amount of impact energy to the greatest amount of impact energy (Table 1). For each padding, peak impact forces were identified immediately after trials of medium and high impact energies. In the event that the peak impact force recorded for a particular padding for a given impact energy level reached a magnitude close to the maximum rated load of the forceplate (18 kN), impact tests of higher impact energies were not performed for that padding to prevent damage to the forceplate.

Session III

This testing session, completed on Jul. 29, 2005, was added to determine the force attenuation properties of a honeycomb board similar to H1 but slight thinner than the H1 used in Session II (labeled as H1$b$). Because only Gray-H1$b$-Gray (G-H1$b$-G) and Blue-H1$b$-Gray (B-H1$b$-G) combination were chosen for testing, a total of 36 tests (18 impact conditions×2 FHF combinations) were planned for this session. For each combination the testing protocol was the same as in Session II. Since certain impact conditions of high impact energies were not conducted to prevent damage to the forceplate, the total number of tests completed was less than originally planned.

Data Analysis

In each impact test, the largest vertical ground reaction force value was identified as the peak impact force transmitted through the padding. Peak impact force data were tabulated and graphed for easy comparison among different padding combinations.

Results and Discussion

The primary purpose of this study was to provide force attenuation characteristics of different padding combinations for the determination of optimal padding combinations for a hip protector that can minimize the chance of hip fracture during a fall. Data most relevant to the primary purpose are presented and discussed in detail in this section.

Session I

Figure 9:
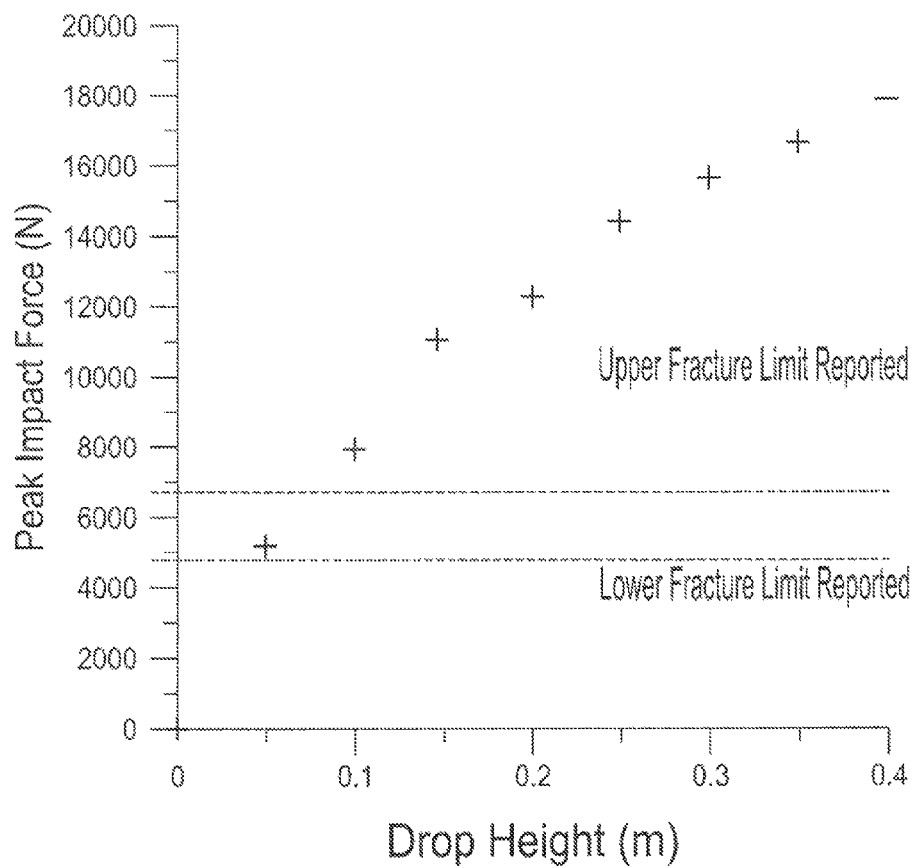
FIG. 9 is a plot of impact force measured as a function of drop height for the flat striker.
Figure 10:
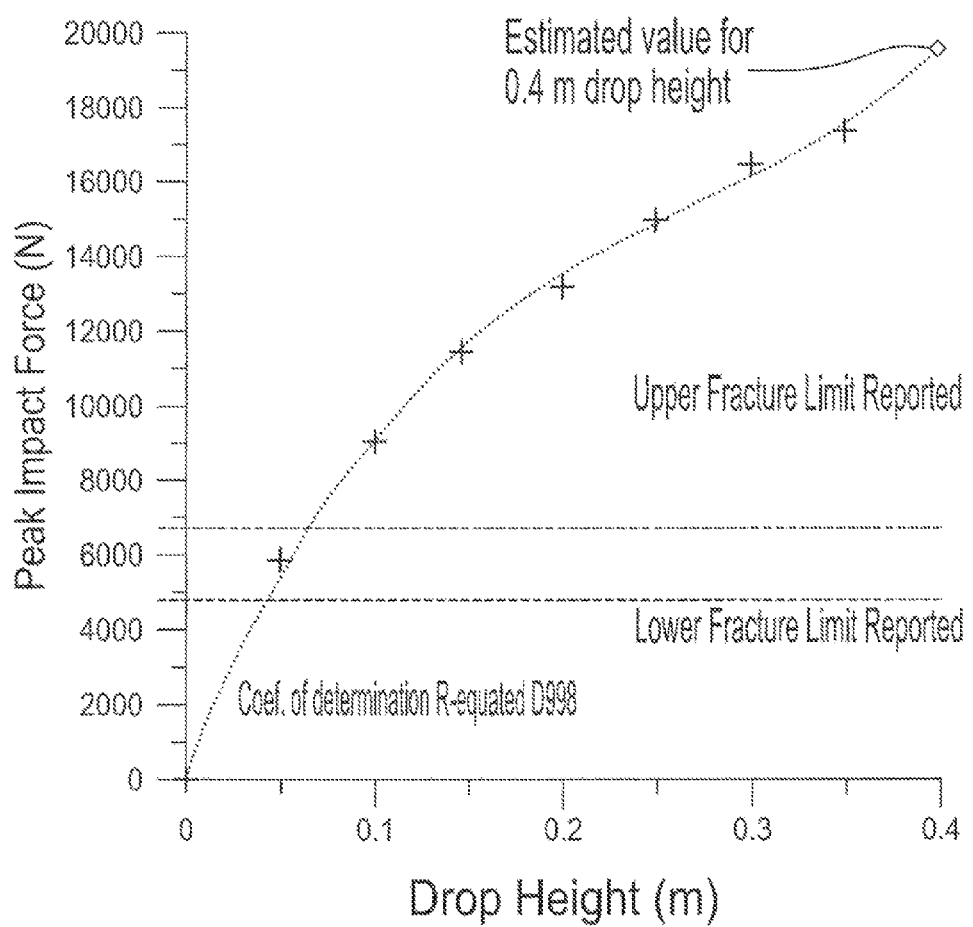
FIG. 10 is a plot of impact force measured as a function of drop height for the rounded striker.

Baseline Impact Tests. As expected, the peak impact force increased steadily with increasing drop height for both striker heads (FIG. 9). When the drop height was increased to 0.4 m (same as Impact Condition #1 in Table I), the peak impact force of 17.9 kN was recorded for the flat striker head. Tests using the round striker were stopped at 0.35 m because a peak impact force of 17.4 kN was recorded at that drop height. A drop height of 0.4 m using the round striker is likely to exceed 18 kN, which is the rate load of the forceplate. By fitting a third order polynomial to all data points collected for the round striker head, the baseline peak impact force for the Impact Condition #1 was estimated to be 20.0 kN (FIG. 10). As a result, percent force attenuation could only be computed for the Impact Condition #1 (drop mass of 3.18 kg and drop height of 0.4 m).

According to Robinovitch et al. (15) and Wiener et al. (21), peak impact forces sustained in the hip region during a fall can range between 5,000 and 26,517 N. The results of the baseline tests indicate that impact forces delivered during the current experiment reached 17.9 kN for the flat striker and 20.0 kN for the round striker when using a drop mass of 3.16 kg and a drop height of 0.4 m. Therefore, Impact Condition #1 was considered to be the most realistic and all impact conditions involving masses and heights greater than those used in the baseline tests (i.e., Impact Conditions #2-9 in Table 1) were considered to be supramaximal. Honeycomb Testing. Because the purpose of these tests was to provide data to a potential honeycomb supplier for determining the type and thickness of honeycomb board to be tested in Session II, the results are of little relevance to the primary purpose of this project.

Session II

Because impact Condition #1 was considered to be the most realistic in the context of possible hip fractures during a fall, results obtained from Impact Condition #1 would be the primary focus of this investigation.

Force Attenuation.

Figure 11:
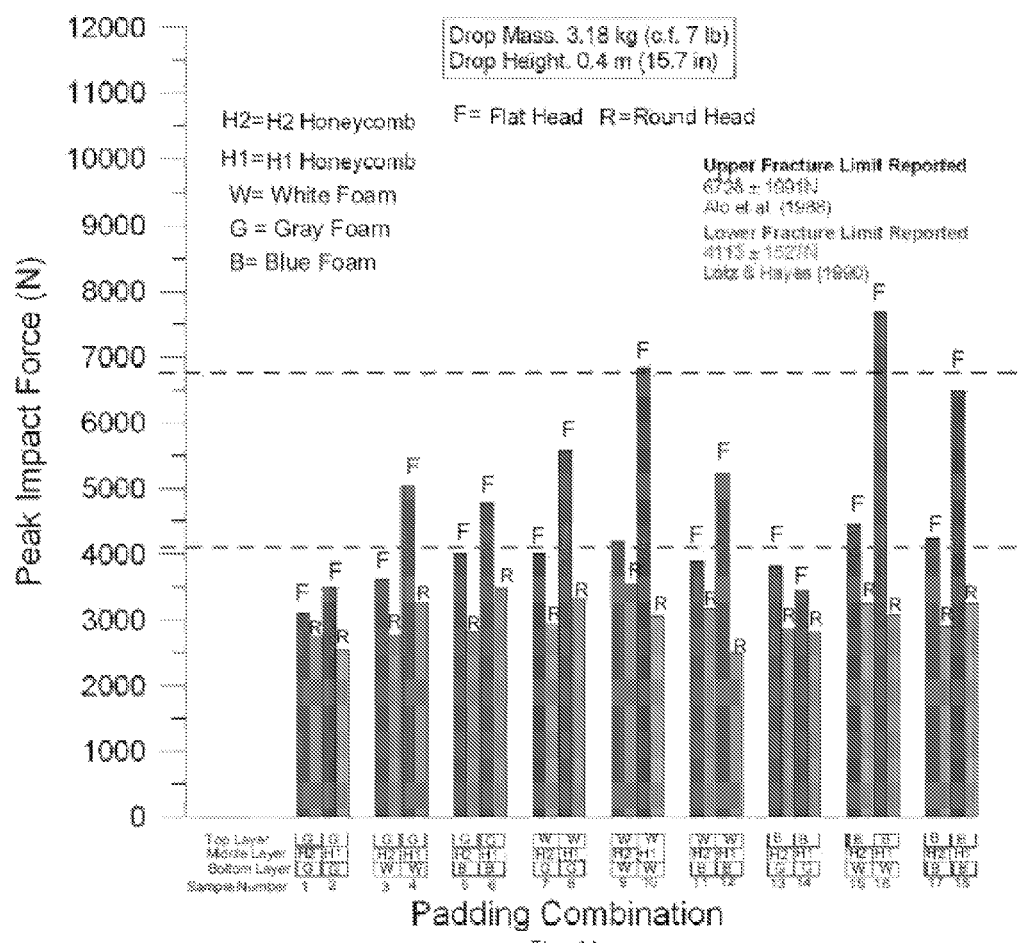
FIG. 11 is a bar graph of peak impact force measured for impact condition number 1 for different foam-honeycomb-foam combinations.

For the Impact Condition #1, many of the padding combinations were capable of reducing the peak impact force to a level below the estimated values [4,113±1,527 N (10)] required to cause a hip fracture in elderly (FIG. 11). When compared to the peak impact forces recorded in baseline tests (FIGS. 9 and 10), the reductions in peak impact force ranged from 57.1% for the B-H1-W using a flat striker to 87.2% for the W-H1-B using a round striker (Table 2). Due to the differences in drop mass, drop height, and impact apparatus used, direct comparisons between the results from the current investigation and those reported by Parkkari et al. (14) and Okuizumi et al. (13) are difficult. The peak impact force values found in the current investigation appear to be comparable to those observed by Weiner et al. (21). Using a 9 kg striker made of hard wood, Weiner et al. (21) recorded peak impact forces of 13.4 and 17.1 kN for drop heights of 0.6 m and 0.9 m, respectively. They observed an 84.8%-91% reduction in peak impact force depending on the type of external padding used. When comparing the peak impact force delivered at the 0.6 m drop height in Weiner et al. study (baseline value=13.4 kN) to the current investigation, it seems counterintuitive that the smaller drop mass and lower drop height (Impact Condition #1) of the current investigation would produce a larger peak impact forces (17.9 kN for flat striker and 20.0 kN for round striker). However, Weiner et al. used a softer striker made of wood and covered it with polyethylene foam in an attempt to simulate the skin and fat over the hip region. As a result, the striker itself attenuated some of the impact force delivered. In the current investigation, the striker was made of steel and no attempt was made to simulate the soft tissue in the trochanteric region. Therefore, the peak impact forces delivered in the current investigations were slightly higher than those observed by Weiner et al. (21). If soft tissue had been taken into consideration, the amount of peak force transmitted to the bone would be smaller in magnitude. In other words, the experimental setup used in this investigation tended to overestimate the peak force transmitted to the bone.

For the Impact Condition #1, more than half of the padding combinations were able to attenuate more than 80% of the peak impact force (Table 2). For outer and inner foam layers, the padding combinations that attenuated the most peak impact force consisted more frequently of gray and blue foam pads. Data from the Impact Condition #1 did not clearly demonstrate one type of honeycomb material being superior to another in terms of force attenuation. However, when considering the results for Impact Conditions #3-7, there appeared to be a superior performance in the H1 honeycomb (i.e., H1 tended to attenuate more force than H2 for the same padding combination). It should be mentioned that the H1 honeycomb used in this experiment was slightly thicker than the H2 honeycomb (9 mm vs. 7 mm). The difference in force attenuation capability may be due to in part the difference in thickness.

Figure 1A:
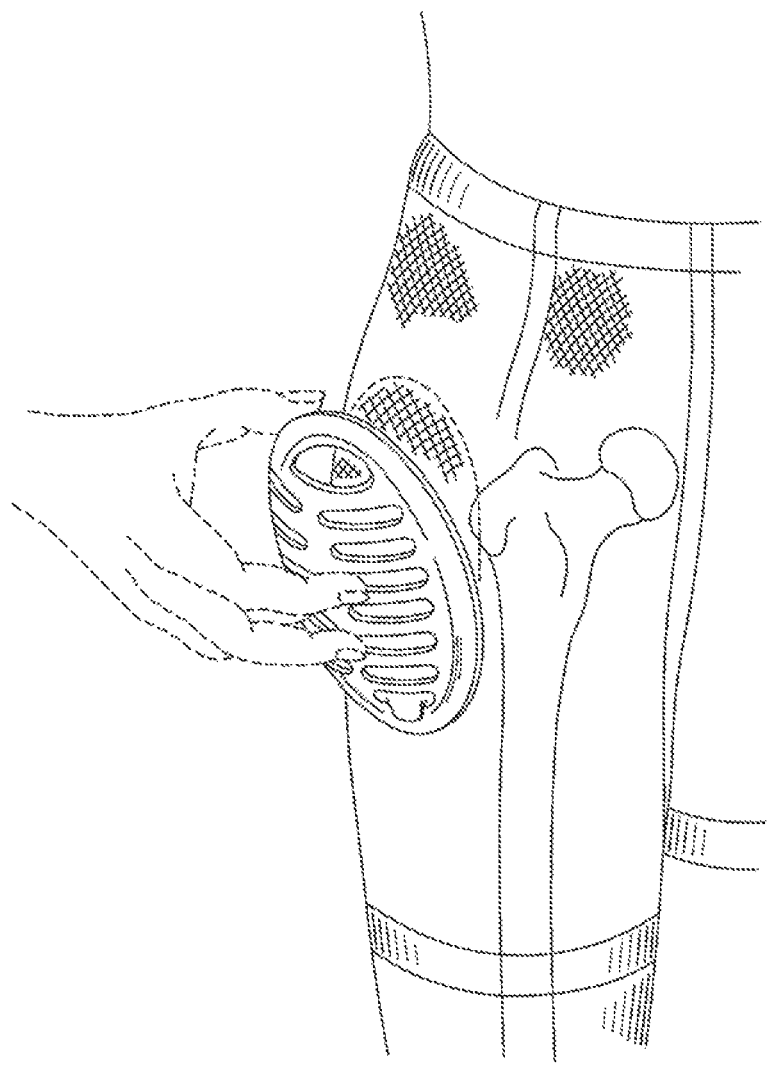
FIG. 1A is a perspective view of a prior art hip protector having a rigid force redistribution shell.
Figure 1B:
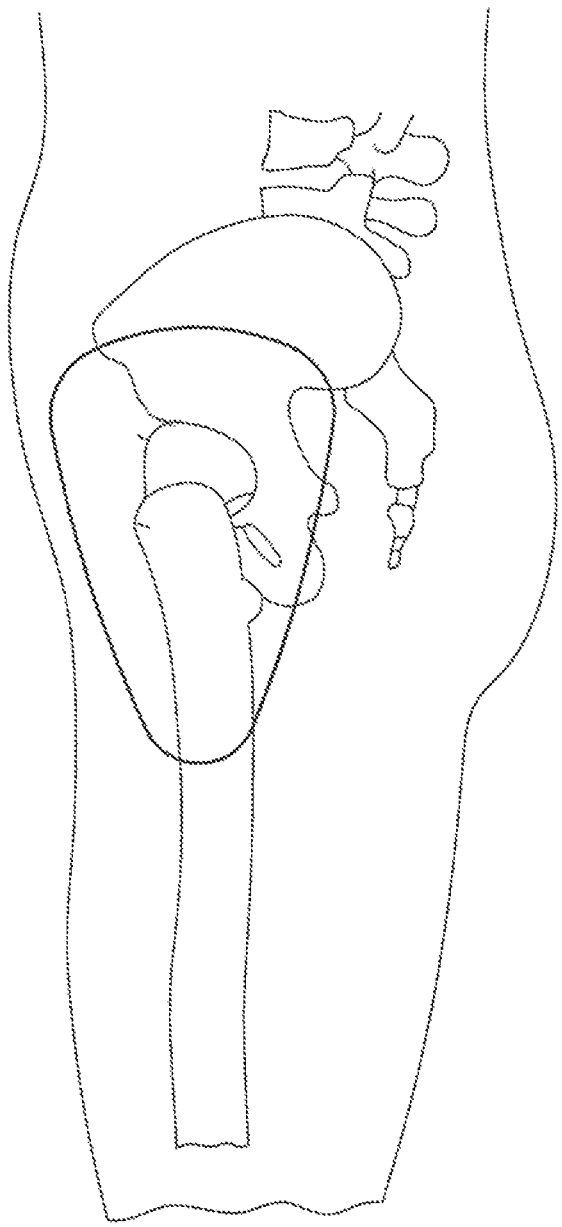
FIG. 1B is a perspective view of a prior art compliant foam hip protector pad.
Figure 1C:
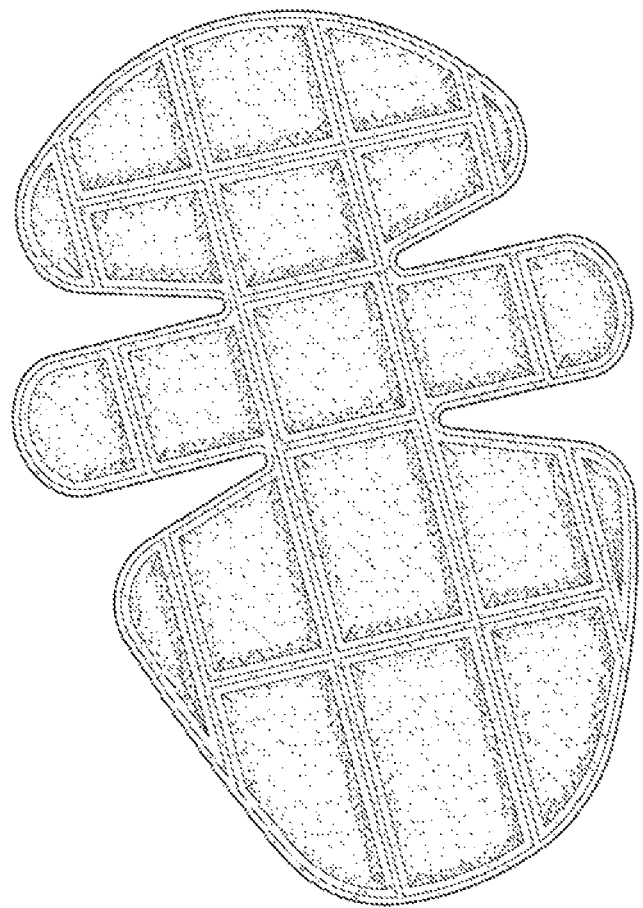
FIG. 1C is a plan view of a prior art body protection pad having honeycomb fragments contained inside foam interconnected together by webbing to fold over a knee, elbow or shoulder joint.

It should be noted that the impact forces of the pad illustrated in FIG. 1C were also tested. In comparison to non-segmented pads, this segmented pad showed peak impact forces that were much greater, namely approximately 9850 N to 14500 N. These impact forces were well above the fracture limits reported in the literature.

TABLE 2

Peak impact forces and the reductions in peak impact force for different padding combinations for Impact Condition #1

| Striker Head: F(flat), R(round) | Padding Combination Layering | | | Peak Impact Force (N) | Reduction (%) |
|---|---|---|---|---|---|
| | Outer | Mid | Inner | | |
| R | W | H1 | B | 2,509 | 87.2 |
| R | G | H1 | G | 2,545 | 87.0 |
| R | G | H2 | G | 2,752 | 85.9 |
| R | G | H2 | W | 2,775 | 85.8 |
| R | B | H1 | G | 2,816 | 86.5 |
| R | G | H2 | B | 2,833 | 85.5 |
| R | B | H2 | G | 2,871 | 85.3 |
| R | B | H2 | B | 2,903 | 85.2 |
| R | W | H2 | G | 2,935 | 85.0 |
| R | W | H1 | W | 3,060 | 84.4 |
| R | B | H1 | W | 3,085 | 84.2 |
| R | W | H2 | B | 3,170 | 83.8 |
| R | B | H2 | W | 3,252 | 83.4 |
| R | B | H1 | B | 3,257 | 83.4 |
| R | G | H1 | W | 3,268 | 83.3 |
| R | W | H1 | G | 3,324 | 83.0 |
| F | G | H2 | G | 3,114 | 82.6 |

TABLE 2-continued

Peak impact forces and the reductions in peak impact force for different padding combinations for Impact Condition #1

| Striker Head: F(flat), R(round) | Padding Combination Layering | | | Peak Impact Force (N) | Reduction (%) |
|---|---|---|---|---|---|
| | Outer | Mid | Inner | | |
| R | G | H1 | B | 3,478 | 82.2 |
| R | W | H2 | W | 3,542 | 81.9 |
| F | B | H1 | G | 3,451 | 80.8 |
| F | G | H1 | G | 3,495 | 80.5 |
| F | G | H2 | W | 3,618 | 79.8 |
| F | B | H2 | G | 3,826 | 78.7 |
| F | W | H2 | B | 3,898 | 78.3 |
| F | G | H2 | B | 4,002 | 77.7 |
| F | W | H2 | G | 4,013 | 77.6 |
| F | W | H2 | W | 4,204 | 76.5 |
| F | B | H2 | B | 4,252 | 76.3 |
| F | B | H2 | W | 4,477 | 75.0 |
| F | G | H1 | B | 4,788 | 73.3 |
| F | G | H1 | W | 5,043 | 71.9 |
| F | W | H1 | B | 5,226 | 70.8 |
| F | W | H1 | G | 5,584 | 68.8 |
| F | B | H1 | B | 6,488 | 63.8 |
| F | W | H1 | W | 6,858 | 61.7 |
| F | B | H1 | W | 7,698 | 57.1 |

Optimal Padding Combinations.

A number of factors need to be considered when determining the optimal padding combination for a hip protector. Although the ability of the padding to attenuate peak impact force is important, the cost of manufacturing the product, the user comfort and ultimately user compliance must be considered. Considering data for all impact conditions using a round striker, the G-H2-G padding combination ranked consistently in the top 10 in terms of force attenuation. If a softer inner layer is needed for user comfort, padding combinations involving white and gray foam boards are capable of reducing the peak impact force to below the fracture threshold.

Striker Head.

Two strikers were used in the current investigation. It was our intention to approximate the anatomical configuration of the hip region. The round striker was thought to be more closely approximate the greater trochanter of the femur. When a round striker hit a hard surface (as in baseline tests in Session I), the striker's stopping time is shorter (or the stopping distance is shorter). Basic laws of physics result in more force transmitted if the stopping time or distance is shorter. Therefore, a greater peak impact force will be recorded using a round striker for a given drop height when compared to a flat striker. On the other hand, when a round striker hit a soft surface such as the padding combination used in Session II, the curved surface extends the striker's stopping time (or increases the stopping distance) to reduce the peak impact. As a result, for a given drop height a smaller peak impact force is expected when using a round striker on a soft padding as long as the padding is not crushing down and "bottoming out." For the Impact Condition #1, a smaller peak impact force was transmitted when the impact was delivered with the round striker for a given padding combination (FIG. 10 and Table 2, see attachment A). However, when considering the remaining supramaximal impact conditions, impact forces delivered by the round striker tended to be larger in magnitude probably because the padding was "bottomed out." In fact, for impact conditions of greater drop masses (5.44 kg and 7.71 kg) and drop heights (0.6 m and 0.8 m), many of the round striker tests were not performed due to the potential damage to the forceplate.

Session III

The testing of a thinner H1 honeycomb (H1b) layer was added to determine if a decrease in thickness (from 9 mm to 7 mm) would reduce the force attenuation capability. Using the 7 mm gray foam pads as the outer and inner layers, intuitively, it was expected that the thicker version of the same honeycomb material would transmit less peak force. However, this idea was only partially supported by the observed data (Table 3). For the Impact Condition #1, the thinner honeycomb transmitted lower peak impact force with the flat striker and greater peak force with the round striker when compared to the thicker honeycomb. However, as the impact energy increased, the thinner material tended to transmit more peak impact force, regardless of the striker type. Therefore, under the most realistic impact condition of the current investigation, there is no apparent difference between H1 and H1b in peak impact force attenuation. In fact, the thinner H1b honeycomb may be more ideal because it helps to reduce the overall thickness of the hip protector and promote user compliance.

TABLE 3

Peak Impact Forces (in N) for G-H1-G and G-H1b-G padding combinations

| Impact Condition | Mass | Drop Height | Flat Striker | | Round Striker | |
|---|---|---|---|---|---|---|
| # | (kg) | (m) | G-H1-G | G-H1b-G | G-H1-G | G-H1b-G |
| 1 | 3.18 | 0.4 | 3,495 | 2,687 | 2,545 | 2,749 |
| 2 | 5.44 | 0.4 | 7,185 | 3,957 | 4,510 | 7,185 |
| 3 | 7.71 | 0.4 | 5,029 | 5,300 | 9,281 | 5,029 |
| 4 | 3.18 | 0.6 | 4,991 | 3,589 | 3,485 | 4,991 |
| 5 | 5.44 | 0.6 | 6,742 | 5,677 | 9,776 | 6,742 |
| 6 | 7.71 | 0.6 | 9,014 | 10,801 | 16,506 | 9,014 |
| 7 | 3.18 | 0.8 | 7,123 | 3,545 | 5,073 | 7,123 |
| 8 | 5.44 | 0.8 | 9,629 | 13,088 | 14,542 | 9,629 |
| 9 | 7.71 | 0.8 | 18,005 | 18,594 | 18,586 | 18,005 |

Test Conclusion

The impact forces delivered with the lowest drop mass (3.18 kg) and lowest drop height (0.4 m) during the current investigations were believed to approximate realistic impact forces sustained during standing lateral falls. The material tested in the current investigation attenuated between 57.1 and 87.2% of the peak force delivered. In addition, many of the padding combinations reduced the peak impact force to values below a critical level known to cause hip fractures in elderly. Among different impact conditions, the FHF combinations using 7 mm gray foam pads as inner and outer layers consistently performed better than the other combinations in terms of peak impact force attenuation. Therefore, it is anticipated that a hip protector made with a gray-honeycomb-gray combination will be the most effective in preventing hip fractures during a fall. If a softer inner layer is needed for user comfort, padding combinations involving white and gray foam pads are capable of reducing the peak impact force to below the fracture threshold.

Trial Data

Informal experimental trials of the embodiment of FIGS. 2A and 2B were carried out at two facilities to determine the comfort of the pads in everyday use without forcing the subjects to fall or create an impact of some kind on the greater trochanter area. The object of these trials were to determine if the user would find any discomfort in wearing the pads inserted in the undergarment pockets during prolonged periods of use and during their sleep process. The prototype pads were recovered from the patients once the trials ended.

Test subjects were selected by the heads of the physical and occupational therapy departments of two leading nursing home facilities in Canada. The first facility was in Nova Scotia. Several elderly people wore the pads in the undergarments for a few weeks. Everyone said that they were comfortable for daily wear and sleep wear. No one complained about the comfort.

One patient did fall while wearing the hip protector. This is what the therapist wrote:

k. "Mr. Earl B., an 89 year old man, wore the prototype hip protection pad. He was walking and fell directly on his side, according to his statement. He was able to get up and drive to a hospital for examination. They found no fracture of his hip NOR did they find any bruising from the pad that protected his hip. Mr. B. is a 6'2" man with a 36" inseam on his pants. He had previously broken his hips and has a double hip replacement.

l. Many elderly people feel that if they have a hip replacement, they don't need to wear hip protectors. Mr. B. is a testament to the fact that they absolutely do need to continue to wear hip protectors the right hip protector, so the fracture won't happen again."

Hard shell hip protectors may prevent hip fractures but will create another injury when the wearer falls on them, as they are hard and leave bruising and can cause lacerations of the skin, which can create infections. As the subject, Mr. B demonstrated, the hip protector of FIGS. 2A and 2B leaves no bruising or lacerations on the wearer.

Tests were also carried out with patients at a geriatric facility in Montreal, Quebec, Canada, named Maimonides. All participating patients showed compliance in wearing the hip protectors. The nursing facility staff appreciated the product and is looking forward to when they will be manufactured. No one fell at this facility using the prototype pads during this trial.

It was found that none of the trial users had discomfort when wearing the pads during the day or during their sleep. The pads are so light weight that they did not affect the trial users at all.

What is claimed is:

1. An impact absorbing protection pad, comprising:
a first layer comprising a first compliant and resilient foam material, a first layer top surface, and a first layer bottom surface;
a second layer comprising a flexible honeycomb material, a second layer top surface, and a second layer bottom surface;
a third layer comprising a second compliant and resilient foam material, a third layer top surface, and a third layer bottom surface,
wherein first layer bottom surface faces the second layer top surface, the second layer bottom surface faces the third layer top surface, and
wherein the pad is configured to attenuate a peak impact force resulting from an impact energy of about 12.5 joules to less than about 5600N required to cause a hip fracture.

2. The pad of claim 1, further comprising:
air pockets disposed between the first layer and the second layer and/or disposed between the second layer and the third layer.

3. The pad of claim 1,
wherein the flexible honeycomb material comprises polypropylene cells.

4. The pad of claim 1,
wherein the first and second foam materials comprise the same material.

5. The pad of claim 4,
wherein the first and second foam materials comprises crosslinked thermoplastic.

6. The pad of claim 5,
wherein the crosslinked thermoplastic comprises a polyolefin.

7. The pad of claim 6,
wherein the polyolefin is polyethylene.

8. The pad of claim 1,
wherein the first foam material has a higher density and is less flexible than the second foam material.

9. The pad of claim 1,
wherein the honeycomb material is from about 7 mm to about 9 mm thick.

10. The pad of claim 1,
wherein the pad is less than about 23 mm thick.

11. The pad of claim 1,
wherein the pad is convexly shaped to fit over a greater trochanter region of an adult human hip.

12. The pad of claim 1,
wherein the pad is flat and shaped to conform around a hip region.

13. The pad of claim 1,
wherein said honeycomb material is resiliently compressible.

14. The pad of claim 13,
wherein said honeycomb material has wavy cell walls configured to allow resilient compression of the honeycomb material.

15. The pad of claim 14,
wherein the honeycomb material comprises hexagonal cell geometry.

16. The pad of claim 1,
wherein the first and third layers contact the second layer.

17. The pad of claim 1,
wherein the first and third layers extend beyond an edge of the second layer and are joined together at a periphery of the pad.

18. The pad as claimed in claim 17,
wherein the joining of the first and third layers is watertight.

19. The pad of claim 1,
wherein the pad comprises an egg-shape or an oval shape.

20. The pad of claim 1, further comprising:
a fourth layer comprising a cover material, a fourth layer top surface, and a fourth layer bottom surface; and
a fifth layer comprising the cover material, a fifth layer top surface, and a fifth layer bottom surface,
wherein the fourth layer bottom surface contacts the second layer top surface, and the fifth layer top surface contacts the second layer bottom surface.

21. An undergarment having a pocket to fit over a greater trochanter area and a hip protector pad that fits into the pocket, wherein the pad comprises:
a first layer comprising a first compliant and resilient foam material, a first layer top surface, and a first layer bottom surface;
a second layer comprising a flexible honeycomb material, a second layer top surface, and a second layer bottom surface;
a third layer comprising a second compliant and resilient foam material, a third layer top surface, and a third layer bottom surface,
wherein first layer bottom surface faces the second layer top surface, the second layer bottom surface faces the third layer top surface, and
wherein the pad is configured to attenuate a peak impact force resulting from an impact energy of about 12.5 joules to less than about 5600N required to cause a hip fracture.

* * * * *